(12) United States Patent
Lu et al.

(10) Patent No.: US 12,476,827 B2
(45) Date of Patent: Nov. 18, 2025

(54) IMPLEMENTATION METHOD AND APPARATUS FOR INCREASING NUMBER OF CERTIFICATES SUPPORTED BY PIV APPLICATION

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 94 days.

(21) Appl. No.: 18/288,037

(22) PCT Filed: Jun. 22, 2022

(86) PCT No.: PCT/CN2022/100353
§ 371 (c)(1),
(2) Date: Oct. 23, 2023

(87) PCT Pub. No.: WO2023/279959
PCT Pub. Date: Jan. 12, 2023

(65) Prior Publication Data
US 2024/0214220 A1    Jun. 27, 2024

(30) Foreign Application Priority Data
Jul. 8, 2021 (CN) .......................... 202110769859.9

(51) Int. Cl.
*H04L 9/32* (2006.01)
*G06F 9/455* (2018.01)

(52) U.S. Cl.
CPC ........ *H04L 9/3263* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| 2005/0154898 A1* | 7/2005 | Chao | G06F 21/602 |
|---|---|---|---|
|  |  |  | 713/185 |
| 2009/0055892 A1* | 2/2009 | Lu | H04L 9/3226 |
|  |  |  | 726/2 |

(Continued)

FOREIGN PATENT DOCUMENTS

WO    2022255886 A1    12/2022

*Primary Examiner* — Raqiul A Choudhury
(74) *Attorney, Agent, or Firm* — J. Clinton Wimbish; Maynard Nexsen PC

(57) ABSTRACT

Method for increasing a number of certificates, in which a data endpoint address is set to be an endpoint address of a Chip/Smart Card Interface Devices (CCID) interface that receives instruction data, so Application Protocol Data Unit (APDU) data used for authentication of a Personal Identity Verification (PIV) application of a key device are obtained and sent to the PIV application. The PIV application calls an Application Programming Interface (API) interface to obtain a CCID interface number, obtains a PIV device certificate number according to a general device certificate number in the APDU data and the CCID interface number, obtains a PIV certificate according to the PIV device certificate number, and operates according to the PIV certificate to obtain operation results returned by a virtual machine of the key device to an upper computer according to the data endpoint address. The method overcomes limitation of the number of certificates.

8 Claims, 6 Drawing Sheets

(56) References Cited

U.S. PATENT DOCUMENTS

| | | | |
|---|---|---|---|
| 2011/0084799 A1* | 4/2011 | Ficko | G07C 9/27 340/5.65 |
| 2011/0179290 A1* | 7/2011 | Adams | G07F 7/00 713/193 |
| 2021/0250184 A1* | 8/2021 | Simplicio, Jr. | H04L 9/30 |
| 2022/0303265 A1* | 9/2022 | Liao | H04L 9/3268 |

* cited by examiner

IMPLEMENTATION METHOD AND APPARATUS FOR INCREASING NUMBER OF CERTIFICATES SUPPORTED BY PIV APPLICATION

TECHNICAL FIELD

The present invention relates to a method for increasing a number of certificates supported by a PIV (Personal Identity Verification) application and an apparatus therefor, which belongs to information security technology field.

PRIOR ART

In prior art, a default number of certificates supported by the PIV application is 4, if the number of the certificates is more than 4, an extra driver is needed to be installed on a host computer, while the extra installed driver may lead to compatibility problem and occupies resource of the host computer, which causes an operating process becomes more complicated.

SUMMARY OF THE INVENTION

The object of the present disclosure is to provide a method for increasing a number of certificates supported by a PIV application and an apparatus therefor, which breaks any limit of a number of certificates supported by the PIV application and simplifies relevant operating as well.

According to one aspect of the present disclosure, there is provided a method for increasing a number of certificates supported by a PIV application, which includes the following steps:

Step 1, a virtual machine of a key device powers up and declares a first CCID (Chip/Smart Card Interface Devices) interface and a second CCID interface to a host computer;

Step 2, the virtual machine waits for receiving an instruction sent from the host computer;

Step 3, the virtual machine determines whether instruction data is in a cache of the first CCID interface, if yes, sets a data endpoint address to be an endpoint address of the first CCID interface, executes Step 4, if no, executes Step 8;

Step 4, the virtual machine acquires APDU ( ) data used for PIV application authentication according to the instruction data, sends the APDU data used for PIV application authentication to the PIV application of the key device;

Step 5, the PIV application of the key device acquires a CCID interface number by invoking an API interface;

Step 6, the PIV application of the key device acquires PIV device certificate number according to a general device certificate number in the APDU data used for PIV application authentication and the CCID interface number, acquires PIV certificate according to the PIV device certificate number, performs operation according to the PIV certificate so as to obtain an operating result;

Step 7, the virtual machine returns the operating result to the host computer according to the data endpoint address, then go back to Step 3;

Step 8, the virtual machine determines whether instruction data is in cache of the second CCID interface, if yes, sets the data endpoint address to be endpoint address of the second CCID interface, execute Step 4, if no, go back to Step 3;

the method further includes: when a USB interruption triggering happens, a USB interruption process is performed.

The USB interruption process includes:

Step 1A, the virtual machine of the key device determines whether the first CCID interface receives an APDU instruction, if yes, the virtual machine stores instruction data of the APDU instruction in the cache of the first CCID interface, if no, execute Step 2A;

Step 2A, the virtual machine determines whether the second CCID interface receives an APDU instruction, if yes, the virtual machine stores instruction data of the APDU instruction in the cache of the second CCID interface, if no, go back to Step 1A.

According to a second aspect of the present disclosure, there is provided an apparatus for increasing a number of certificates supported by a PIV application, which includes at least one processor, a storage and at least one processor executable instruction stored in the storage, the at least one processor executes a computer executable instruction to implement the method described above.

According to a third aspect of the present disclosure, there is provided a computer readable storage medium. The computer readable storage medium includes a computer program, when the computer program runs on an apparatus for increasing a number of certificates supported by a PIV application, the apparatus for increasing a number of certificates supported by a PIV application executes the method described above.

According to a fourth aspect of the present disclosure, there is provided a chip. The chip is coupled to the storage and is configured to execute a computer program stored in the storage to implement the method described above.

According to the present invention, there is provided an implementing method for increasing a number of certificates supported by a PIV application, the method requires no extra driver installed and breaks number limit of those certificates supported by the PIV application, and simplifies relevant operating as well.

DESCRIPTION OF EMBODIMENTS

The technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present invention.

Embodiment 1

Figure 1:
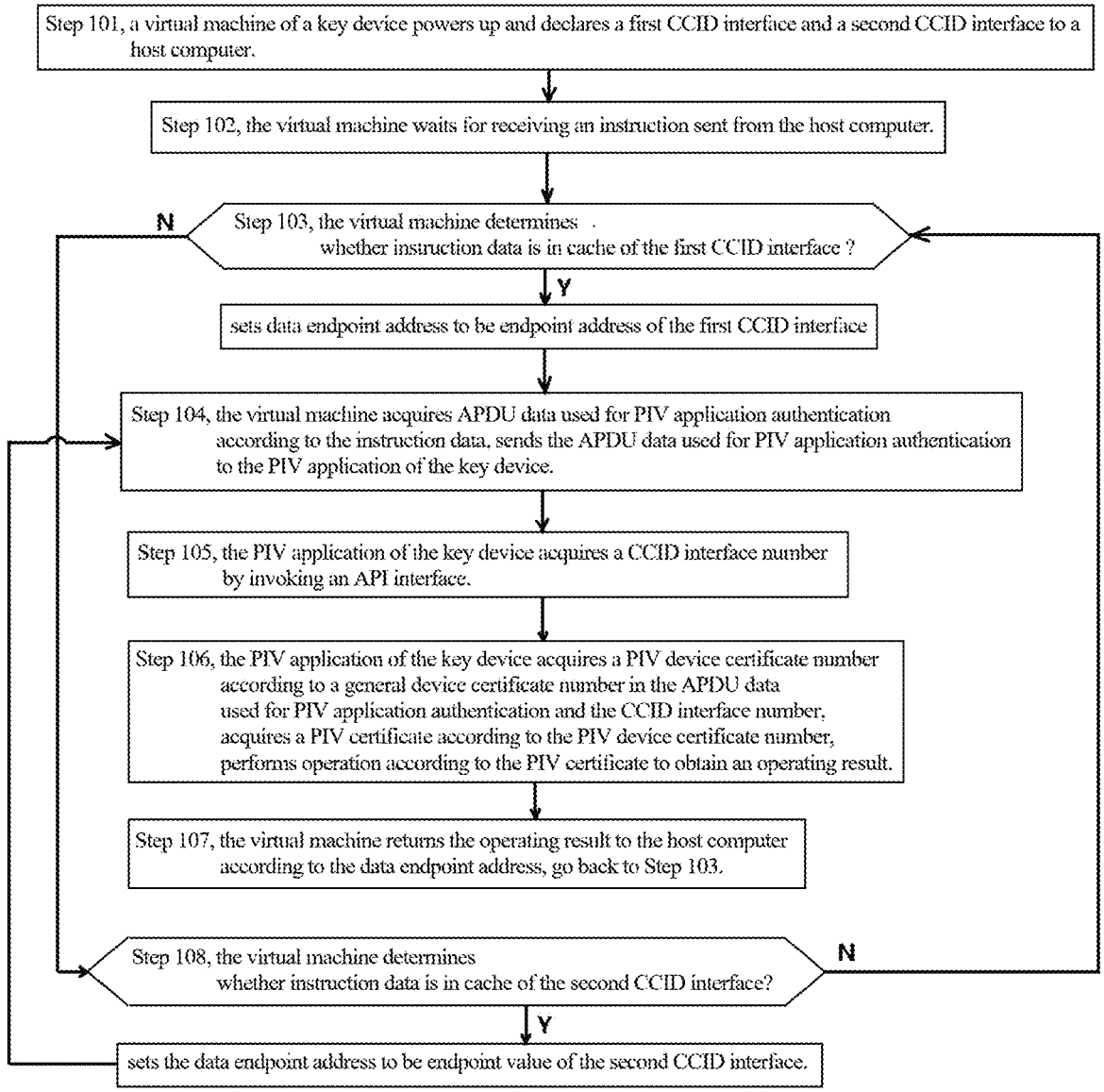
FIG. 1 is a flow chart for an implementing method for increasing a number of certificates supported by a PIV application provided in Embodiment 1 of the present invention.

Embodiment 1 provides an implementing method for increasing a number of certificates supported by a PIV application. As shown in FIG. 1, the method includes the following steps:

Step 101, a virtual machine of a key device powers up and declares a first CCID interface and a second CCID interface to a host computer;

Step 102, the virtual machine waits for receiving an instruction sent from the host computer;

Step 103, the virtual machine determines whether instruction data is in a cache of the first CCID interface, if yes, sets data endpoint address to be endpoint address of the first CCID interface, execute Step 104, if no, execute Step 108;

Step 104, the virtual machine acquires APDU (Application Protocol Data Unit) data used for a PIV application authentication according to the instruction data, sends the APDU data used for the PIV application authentication to the PIV application of the key device;

Step 105, the PIV application of the key device acquires a CCID interface number by invoking an API (Application Programming Interface) interface;

Step 106, the PIV application of the key device acquires a PIV device certificate number according to a general device certificate number in the APDU data used for PIV application authentication and the CCID interface number, acquires a PIV certificate according to the PIV device certificate number, performs operation according to the PIV certificate to obtain an operating result;

Step 107, the virtual machine returns the operating result to the host computer according to the data endpoint address, then goes back to Step 103;

Step 108, the virtual machine determines whether instruction data is in a cache of the second CCID interface, if yes, sets the data endpoint address to be an endpoint value of the second CCID interface, executes Step 104, while if no, goes back to Step 103.

Figure 2:
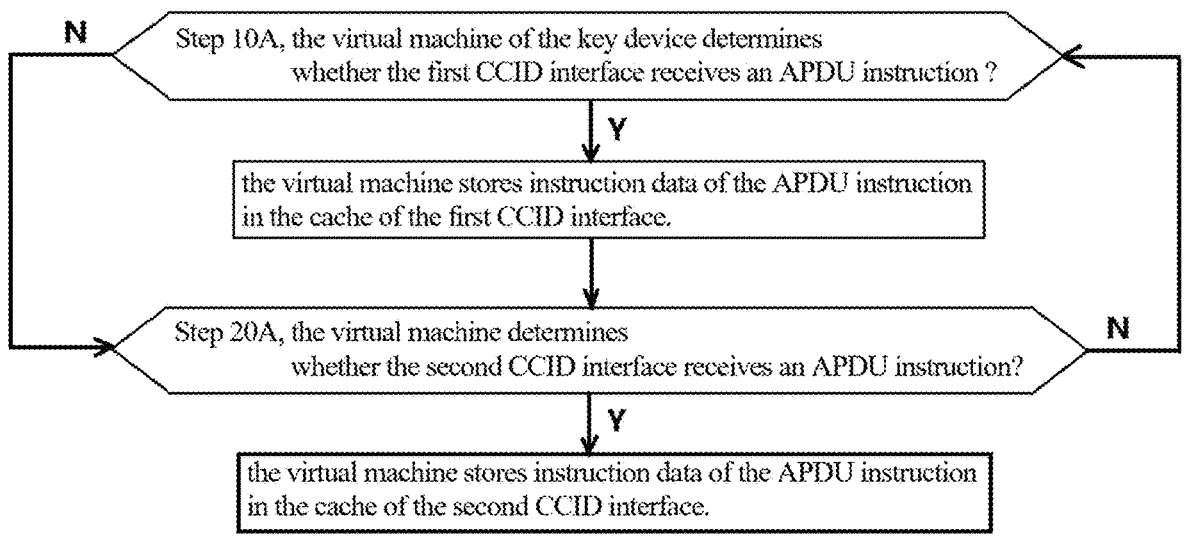
FIG. 2 is a flow chart of USB interruption process in the implementing method for increasing number of certificates supported by a PIV application provided in Embodiment 1 of the present invention.

The method further includes: when a USB interruption triggering happens, a USB interruption process is performed. As shown in FIG. 2, the USB interruption process includes:

Step 10A, the virtual machine of the key device determines whether the first CCID interface receives an APDU instruction, if yes, the virtual machine stores instruction data of the APDU instruction in the cache of the first CCID interface, while if no, executes Step 20A;

Step 20A, the virtual machine determines whether the second CCID interface receives an APDU instruction, if yes, the virtual machine stores instruction data of the APDU instruction in the cache of the second CCID interface, while if no, goes back to Step 10A.

In Embodiment 1, in Step 103, after setting the data endpoint address to be the endpoint address of the first CCID interface, the method further includes: closing a delay timer of the first CCID interface.

In Step 108, after setting the data endpoint address to be the endpoint address of the second CCID interface, the method further includes: closing a delay timer of the second CCID interface.

In Step 10A, after the virtual machine stores the instruction data of the APDU instruction in the cache of the first CCID interface, the method further includes: activating the delay timer of the first CCID interface, sending a delay request to the host computer via the first CCID interface according to time of the delay timer of the first CCID interface at a regular preset time interval.

In Step 20A, after the virtual machine stores the instruction data of the APDU instruction in the cache of the second CCID interface, the method further includes: activating the delay timer of the first CCID interface, sending a delay request to the host computer via the second CCID interface according to time of the delay timer of the second CCID interface at a regular preset time interval.

In Embodiment 1, Step 10A specifically is: the virtual machine of the key device determines whether the first CCID interface receives an APDU instruction used for PIV application authentication, if yes, the virtual machine of the key device stores instruction data of the APDU instruction used for PIV application authentication in the cache of the first CCID interface, while if no, executes Step 20A.

Step 20A specifically is: the virtual machine of the key device determines whether the second CCID interface receives an APDU instruction used for PIV application authentication, if yes, the virtual machine of the key device stores instruction data of the APDU instruction used for PIV application authentication in the cache of the second CCID interface, while if no, goes back to Step 10A.

In Embodiment 1, before Step 101, the method further includes a process for loading a certificate, which includes the following steps:

Step 01, the virtual machine of the key device receives a certificate importing instruction sent from the host computer, sends instruction data of the certificate importing instruction to the PIV application of the key device; and Step 02, the PIV application of the key device sets a PIV certification number of an imported certificate according to value of a preset byte in the instruction data of the certificate importing instruction.

In Embodiment 1, before Step 101, the method further includes a process for loading a certificate, which includes the following steps:

Step 01', the virtual machine of the key device receives a certificate importing instruction sent from the host computer, sends instruction data of the certificate importing instruction to the PIV application of the key device; and Step 02', the PIV application of the key device acquires a CCID interface number of the certificate importing instruction, sets a PIV device certificate number of the imported certificate according to value of a preset byte in the instruction data of the certificate importing instruction and the CCID interface number.

In Embodiment 1, Step 101 specifically is: the virtual machine of the key device powers up, declares HID (Human Interface device) interface, a first CCID interface and a second CCID interface to the host computer.

After Step 102, the method further includes: the virtual machine determines whether the HID interface has the instruction data, if yes, executes Step m1; while if no, executes Step 103;

Step m1, the virtual machine sets a USB interface type identification to be HID interface, determines whether the instruction data is APDU data, if yes, executes Step m3, while if no, executes Step m2;

Step m2, the virtual machine performs operation on the instruction data to obtain an operating result, then executes Step m5;

Step m3, the virtual machine sends the instruction data to FIDO (Fast Identity Online) application of the key device;

Step m4, the FIDO application of the key device performs operation on the instruction data to obtain an operating result; and Step m5, the virtual machine acquires data endpoint address according to the USB interface type identification, returns the operating result to the host computer according to the data endpoint address, executing Step 102.

In the USB interruption process, before Step 10A, the process further includes:

Step 01A, the virtual machine of the key device determines whether the HID interface receives an instruction, if yes, execute Step 02A, if no, execute Step 10A;

Step 02A, the virtual machine determines instruction type of the instruction received by the HID interface, if the instruction is a cancel instruction, the virtual machine returns a response of cancel instruction via the HID interface to the host computer; if the instruction is non-cancel instruction, the virtual machine stores the instruction data of the non-cancel instruction in the cache of the HID interface, execute Step 10A;

In Step 20A, if no, going back to Step 10A specifically is: if no, ending the USB interruption process.

In Embodiment 1, Step m2 specifically is: the virtual machine determines a type of the instruction data, when the instruction data is MSG (Message) data, executes Step m3, when the instruction data is CBOR (Concise Binary Object Representation) data, the virtual machine fills CBOR data to obtain extension APDU data, sends the extension APDU data to the FIDO application; and when the instruction data is INIT (Initialization) data, the virtual machine performs operation on the INIT data to obtain an operating result, then executes Step m5.

Embodiment 2

Figure 3:
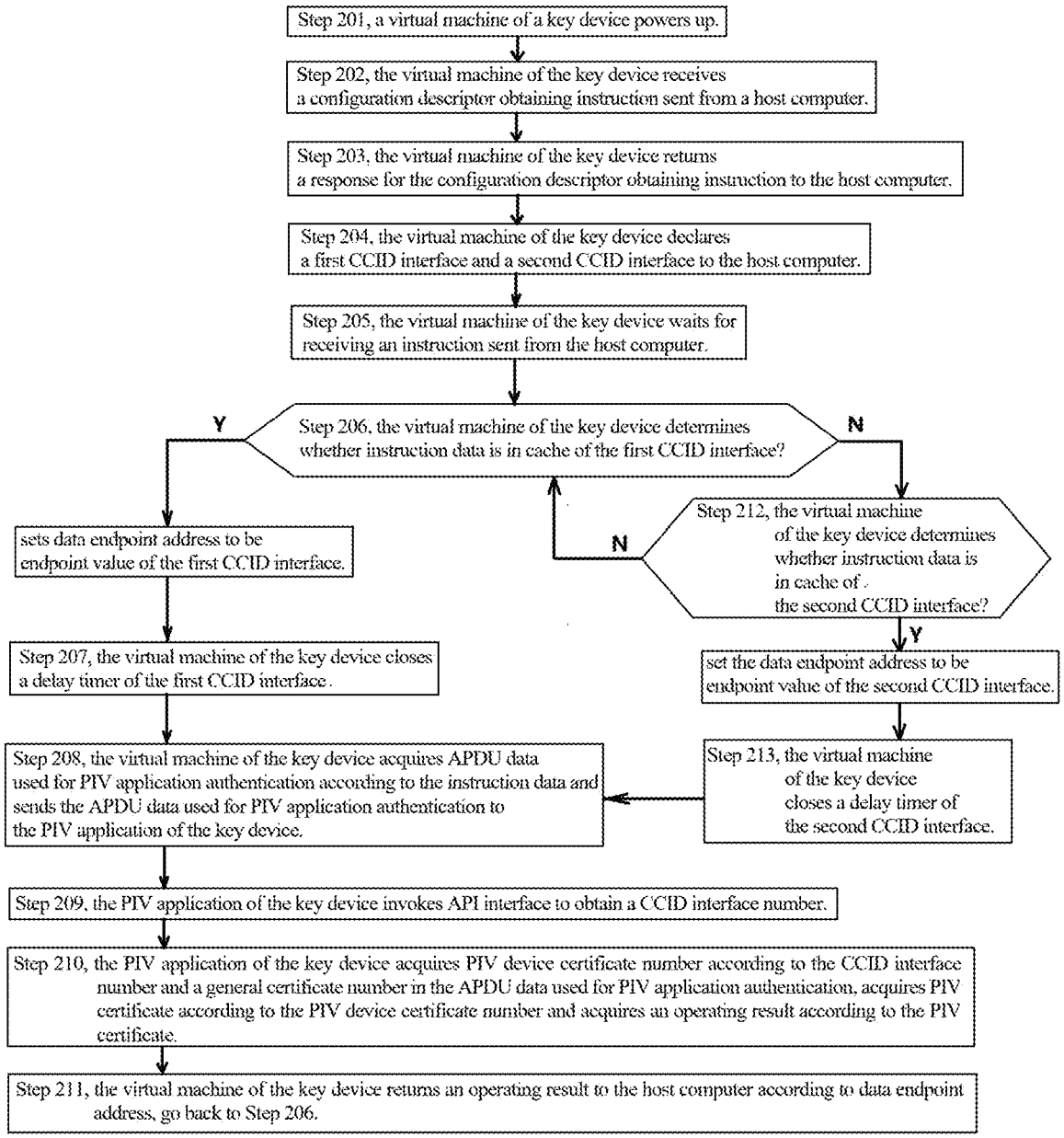
FIG. 3 is a flow chart for an implementing method for increasing number of certificates supported by a PIV application provided in Embodiment 2 of the present invention.

Embodiment 2 provides an implementing method for increasing a number of certificates supported by a PIV application. As shown in FIG. 3, the method includes the following steps:

Step 201, a virtual machine of a key device powers up;

Step 202, the virtual machine of the key device receives a configuration descriptor obtaining instruction sent from a host computer;

Step 203, the virtual machine of the key device returns a response for the configuration descriptor obtaining instruction to the host computer.

In Embodiment 2, the virtual machine of the key device organizes the response for the configuration descriptor obtaining instruction according to the number of interfaces and interface configuration descriptors, for example, the response for the configuration descriptor obtaining instruction is:

09 02 C3 00 02 01 00 80 14 09 21 10 01 00 01 22 22 00
07 05 02 03 40 00 02 07 05 81 03 40 00 02 09 04 01 00 02
0B 00 00 03 36 21 10 01 00 01 03 00 00 00 74 0E 00 00 74
0E 00 00 00 80 25 00 00 00 C2 01 00 00 0F 01 00 00 00 00
00 00 00 00 00 00 B4 04 04 00 0F 01 00 00 00 00 00 00 00
01 07 05 04 02 40 00 00 07 05 84 02 40 00 00 09 04 02 00
02 0B 00 00 04 36 21 10 01 00 01 03 00 00 00 74 0E 00 00
74 0E 00 00 00 80 25 00 00 00 C2 01 00 0F 01 00 00 00 00
00 00 00 00 00 00 B4 04 04 00 0F 01 00 00 00 00 00 00 00
01 07 05 05 02 40 00 00 07 05 85 02 40 00 00

In this case, 02 of 09 02 C3 00 02 01 00 80 14 represents that the number of interfaces is 2;

09 04 01 00 02 0B 00 00 03 is a first CCID interface descriptor, the interface number is 01;

09 04 02 00 02 0B 00 00 04 is a second CCID interface descriptor, the interface number is 02.

Step 204, the virtual machine of the key device declares a first CCID interface and a second CCID interface to the host computer;

Step 205, the virtual machine of the key device waits for receiving an instruction sent from the host computer;

Step 206, the virtual machine of the key device determines whether instruction data is in a cache of the first CCID interface, if yes, sets a data endpoint address to be an endpoint value of the first CCID interface, then executes Step 207, while if no, executes Step 212.

Specifically, in Step 206, when the virtual machine of the key device determines that instruction data is in the cache of the first CCID interface, the virtual machine of the key device records the g_in_ep_addr of the data endpoint address as an IN endpoint value of the first CCID interface and records the g_out_ep_addr of the data endpoint address as an OUT endpoint value of the first CCID interface, then executes Step 207.

Step 207, the virtual machine of the key device closes a delay timer of the first CCID interface;

Step 208, the virtual machine of the key device acquires APDU data used for a PIV application authentication according to the instruction data and sends the APDU data used for the PIV application authentication to the PIV application of the key device.

In Embodiment 2, the virtual machine of the key device extracts a CCID protocol head from the instruction data to obtain the APDU data used for PIV application authentication. For example, the key device extracts CCID head, i.e. 6f 10 00 00 00 58 00 00 00 from the instruction data, i.e. 6f 10 00 00 00 00 58 00 00 00 00 87 07 9a 0b 9b 1a 3e ea 16 af 0f a7 cf 9e 6c, to obtain APDU data, i.e. 00 87 07 9a 0b 9b 1a 3e ea 16 af 0f a7 cf 9e 6c.

The virtual machine of the key device sends the APDU data used for the PIV application authentication to the PIV application of the key device.

Step 209, the PIV application of the key device invokes an API interface to obtain a CCID interface number.

Specifically, in Step 209, the PIV application of the key device invokes the APDU.getProtocol( ) interface, determines CCID interface number according to result of invoking the APDU.getProtocol( ) interface.

For example, in Embodiment 2, if the result of invoking the APDU.getProtocol( ) interface is 0xA0, the CCID interface number is determined to be number of the first CCID interface, i.e. 01; if the result of invoking the APDU.getProtocol( ) interface is 0xA1, the CCID interface number is determined to be number of the second CCID interface, i.e. 02.

Step 210, the PIV application of the key device acquires a PIV device certificate number according to the CCID interface number and a general certificate number in the APDU data used for PIV application authentication, acquires a PIV certificate according to the PIV device certificate number and acquires an operating result according to the PIV certificate.

In Step 210, acquiring the operating result according to the PIV certificate can be: performing signing according to key assorted with the PIV certificate to obtain an operating result of signing.

In Embodiment 2, before executing Step 201, the method further includes a process for loading a certificate, which includes the following steps:

Step a1, the virtual machine of the key device receives a certificate importing instruction sent from a host computer, sends instruction data of the certificate importing instruction to the PIV application of the key device; and Step a2, the PIV application of the key device sets a PIV certification number of an imported certificate according to value of a preset byte in the instruction data of the certificate importing instruction.

Step a2 specifically is: the PIV application of the key device acquires a value of a preset byte of the instruction data of the certificate importing instruction, sets a PIV certificate number of the imported certificate according to a first preset corresponding relation and the value of the preset byte.

For example, in Embodiment 2, in Step a1, the virtual machine of the key device receives a certificate importing instruction sent from the host computer, i.e. 6f04010000002300000010db3fffff5c035fc1055382061870 82060f3082060b3 08204f3a0030201020213210000037dfla74983916c3f6e00 030000037d300d06092a864886f70d01010b05003046311 330 11060a0992268993f22c6401191603434f4d311a3018060a 0992268993f22c640119160a49414d51413356495341, the virtual machine of the key device extracts the CCID protocol head, i.e. 6f040100000023000000, acquires the instruction data, i.e. 10db3fffff5c035fc1055382061870820060f3082060b308 204f3a0030201020 213210000037dfla74983916c3f6e00030000037d300d 06092a864886f70d01010b0500304631133011060a09 92268993f2 2c6401191603434f4d311a3018060a0992268993f22c 6401 19160a49414d51413356495341, of the certificate importing instruction, sends the instruction data of the certificate importing instruction to the PIV application of the key device.

In Step a2, the PIV application of the key device acquires the value, i.e. c105, of the sixth byte and the tenth byte of the instruction data, sets the PIV device certificate number, i.e. 9a, of the imported certificate according to the first preset corresponding relation and value, i.e. c105, of the preset byte.

Specifically, the first preset corresponding relation is: corresponding relation between the value of the preset byte and the PIV device certificate number; the specific corresponding relation is:

a first value of the preset byte corresponds to a first PIV device certificate number; a second value of the preset byte corresponds to a second PIV device certificate number; a third value of the preset byte corresponds to a third PIV device certificate number; a fourth value of the present byte corresponds to a fourth PIV device certificate number; a fifth value of the preset byte corresponds to a fifth PIV device certificate number; and a sixth value of the preset byte corresponds to the sixth PIV device certificate number.

For example, a first value of the preset byte, i.e. c105, corresponds to a first PIV device certificate number, i.e. 9a;

a second value of the preset byte, i.e. c10A, corresponds to a second PIV device certificate number, i.e. 9c;

a third value of the preset byte, i.e. c10B, corresponds to a third PIV device certificate number, i.e. 9d;

a fourth value of the present byte, i.e. c205, corresponds to a fourth PIV device certificate number, i.e. 9f;

a fifth value of the preset byte, i.e. c20A, corresponds to a fifth PIV device certificate number, i.e. 91; and a sixth value of the preset byte, i.e. c20B, corresponds to the sixth PIV device certificate number, i.e. 92.

In Embodiment 2, a process for loading the certificate before Step 201 can be implemented by the following steps:

Step b1, the virtual machine of the key device receives a certificate importing instruction sent from a host computer, sends instruction data of the certificate importing instruction to the PIV application of the key device.

For example, in Embodiment 2, in Step a1, the virtual machine of key device receives the certificate importing instruction sent from the host computer, i.e. 6f04010000002300000010db3fffff5c035fc1055382061870 82060f3082060b3 08204f3a0030201020213210000037dfla74983916c3f6e000 30000037d300d06092a864886f70d01010b050030463113 30 11060a0992268993f22c6401191603434f4d311a3018060 a0992268993f22c640119160a49414d51413356495341, extracts the CCID protocol instruction head, i.e. 6f040100000023000000, acquires the instruction data, i.e. 10db3fffff5c035fc1055382061870820060f3082060b3 08204f3a00302010202 13210000037dfla74983916c3f6e00030000037d300d 06092a864886f70d01010b0500304631133011060a09 92268993f22 c6401191603434f4d31 1a3018060a0992268993f22c640119160a49414d514 13356495341, of the certificate importing instruction, sends the instruction data of the certificate importing instruction to the PIV application of the key device.

Step b2, the PIV application of the key device acquires a CCID interface number of the certificate importing instruction, sets PIV device certificate number of the imported certificate according to a value of a preset byte in the instruction data of the certificate importing instruction and the acquired interface number.

In Embodiment 2, Step b2 specifically is: the PIV application of the key device invokes API function to acquire the CCID interface number of the certificate importing instruction, sets the PIV device certificate number of the imported certificate according to the a value of a preset byte in the instruction data of the certificate importing instruction and the acquired interface number in accordance with a second preset corresponding relation.

In Step b2, the PIV application of the key device invokes the APDU.getProtocol( ) interface to obtain an invoking result, acquires the CCID interface number of the certificate importing instruction according to the invoking result.

For example, in Step b2, the PIV application of the key device invokes the APDU.getProtocol( ) interface, if a result of invoking the interface is 0xA0, it means that the CCID interface number is the first CCID interface number, i.e. 01; while if the result of invoking the interface is 0xA1, it means that the CCID interface number is the second CCID interface number, i.e. 02.

Specifically, the second preset corresponding relation is: the corresponding relation among a value of a preset byte, a CCID interface number of the certificate importing instruction and a PIV device certificate number.

In Embodiment 2, the value of the preset byte is corresponding to a value corresponding to a general device certificate number; and the general device certificate number is a PIV application general device certificate number.

Specifically, the second preset corresponding relation is:
a first value of the preset byte and the first CCID interface number of the certificate importing instruction correspond to a first PIV device certificate number;
a second value of the preset byte and the first CCID interface number of the certificate importing instruction correspond to a second PIV device certificate number;
a third value of the preset byte and the first CCID interface number of the certificate importing instruction correspond to a third PIV device certificate number;
a first value of the preset byte and the second CCID interface number of the certificate importing instruction correspond to a fourth PIV device certificate number;
a second value of the preset byte and the second CCID interface number of the certificate importing instruction correspond to a fifth PIV device certificate number; and
a third value of the preset byte and the second CCID interface number of the certificate importing instruction correspond to a sixth PIV device certificate number.

For example, a first value of the preset byte, i.e. c105, and the first CCID interface number of the certificate importing instruction, i.e. 01, correspond to a first PIV device certificate number, i.e. 9a;
a second value of the preset byte, i.e. c10A, and the first CCID interface number of the certificate importing instruction, i.e. 01, correspond to a second PIV device certificate number, i.e. 9c;
a third value of the preset byte, i.e. c10B, and the first CCID interface number of the certificate importing instruction, i.e. 01, correspond to a third PIV device certificate number, i.e. 9d;
a first value of the preset byte, i.e. c105, and the second CCID interface number of the certificate importing instruction, i.e. 02, correspond to a fourth PIV device certificate number, i.e. 9f;
a second value of the preset byte, i.e. c10A, and the second CCID interface number of the certificate importing instruction, i.e. 02, correspond to a fifth PIV device certificate number, i.e. 91; and
a third value of the preset byte, i.e. c10B, and the second CCID interface number of the certificate importing instruction, i.e. 02, correspond to a sixth PIV device certificate number, i.e. 92.

In this case, the first value c105 corresponds to the first general device certificate number 9a;
the second value c10A corresponds to the second general device certificate number 9c; and
the third value c10B corresponds to the third general device certificate number 9d.

For example, in Step b2, the PIV application of the key device invokes the APDU.getProtocol( ) interface, if the result of invoking interface is 0xA1, it means that the CCID interface number is the number of the second CCID interface, i.e. 02; based on the second preset corresponding relation, the PIV device certificate number of the imported certificate is set to be 9f according to the value of the preset byte, i.e. c105 in the instruction data of the certificate importing instruction and the acquired interface number 02.

In Embodiment 2, for example, the PIV application of the key device loads 6 certificates, the PIV device certificate numbers are: 9a, 9c, 9d, 9f, 91 and 92.

In Embodiment 2, the PIV application of the key device presets a corresponding relation between a PIV device certificate number and its corresponding CCID interface number and general certificate number;
the first PIV device certificate number corresponds to the first CCID interface number and the first general device certificate number;
the second PIV device certificate number corresponds to the first CCID interface number and the second general device certificate number;
the third PIV device certificate number corresponds to the first CCID interface number and the third general device certificate number;
the fourth PIV device certificate number corresponds to the second CCID interface number and the first general device certificate number;
the fifth PIV device certificate number corresponds to the second CCID interface number and the second general device certificate number; and
the sixth PIV device certificate number corresponds to the second CCID interface number and the third general device certificate number.

Specifically, for example, the corresponding relation between the PIV device certificate number and its corresponding CCID interface number and the general certificate number is:
the PIV device certificate number, i.e. 9a, corresponds to the first CCID interface number, i.e. 01, and the general device certificate number, i.e. 9a;
the PIV device certificate number, i.e. 9c, corresponds to the first CCID interface number, i.e. 01, and the general device certificate number, i.e. 9c;
the PIV device certificate number, i.e. 9d, corresponds to the first CCID interface number, i.e. 01, and the general device certificate number, i.e. 9d;
the PIV device certificate number, i.e. 9f, corresponds to the second CCID interface number, i.e. 02, and the general device certificate number, i.e. 9a;
the PIV device certificate number, i.e. 91, corresponds to the second CCID interface number, i.e. 02, and the general device certificate number, i.e. 9c; and
the PIV device certificate number, i.e. 92, corresponds to the second CCID interface number, i.e. 02, and the general device certificate number, i.e. 9d.

In Embodiment 2, in Step 209, the PIV application of the key device invokes the APDU.getProtocol( ) interface, if the result of invoking the interface is 0xA0, it means that the CCID interface number is the first CCID interface number, i.e. 01.

Step 209 specifically is: the PIV application of the key device acquires the general device certificate number, i.e. 9a, according to the fourth byte of the APDU data, then determines that the PIV device certificate number is 9a according to the general device certificate 9a and the interface number 01 acquired in Step 209, acquires PIV certificate according to the PIV device certificate number 9a, acquires an operating result according to the PIV certificate.

For example, in Embodiment 2, in Step 209, the PIV application of the key device invokes the APDU.getProtocol( ) interface, if the result of invoking the interface is 0xA1, it means that the CCID interface number is the number of the second CCID interface, i.e. 02.

The PIV application of the key device acquires the general device certificate number, i.e. 9a, according to the fourth byte of the APDU data, then determines that the PIV device certificate number is 9f according to the general device certificate number 9a and the interface number 02 acquired in Step 209, acquires PIV certificate according to the PIV device certificate number 9f, performs operation according to the PIV certificate to acquire an operating result.

Step 211, the virtual machine of the key device returns an operating result to the host computer according to data endpoint address, then goes back to Step 206.

In Embodiment 2, Step 211 specifically is:

the virtual machine of the key device returns the operating result to the host computer according to value of the g_in_ep_addr of the data endpoint address, go back to Step 206.

Step 212, the virtual machine of the key device determines whether instruction data is in a cache of the second CCID interface, if yes, sets the data endpoint address to be the endpoint value of the second CCID interface, then executes Step 213, while if no, goes back to Step 206.

Specifically, in Step 212, when the virtual machine of the key device determines that the instruction data is in the cache of the second CCID interface, the virtual machine of the key device records the g_in_ep_addr of the data endpoint address as IN endpoint value of the second CCID interface and records the g_out_ep_addr of the data endpoint address as OUT endpoint value of the second CCID interface, execute Step 214;

Step 213, the virtual machine of the key device closes a delay timer of the second CCID interface, execute Step 208.

Figure 4:
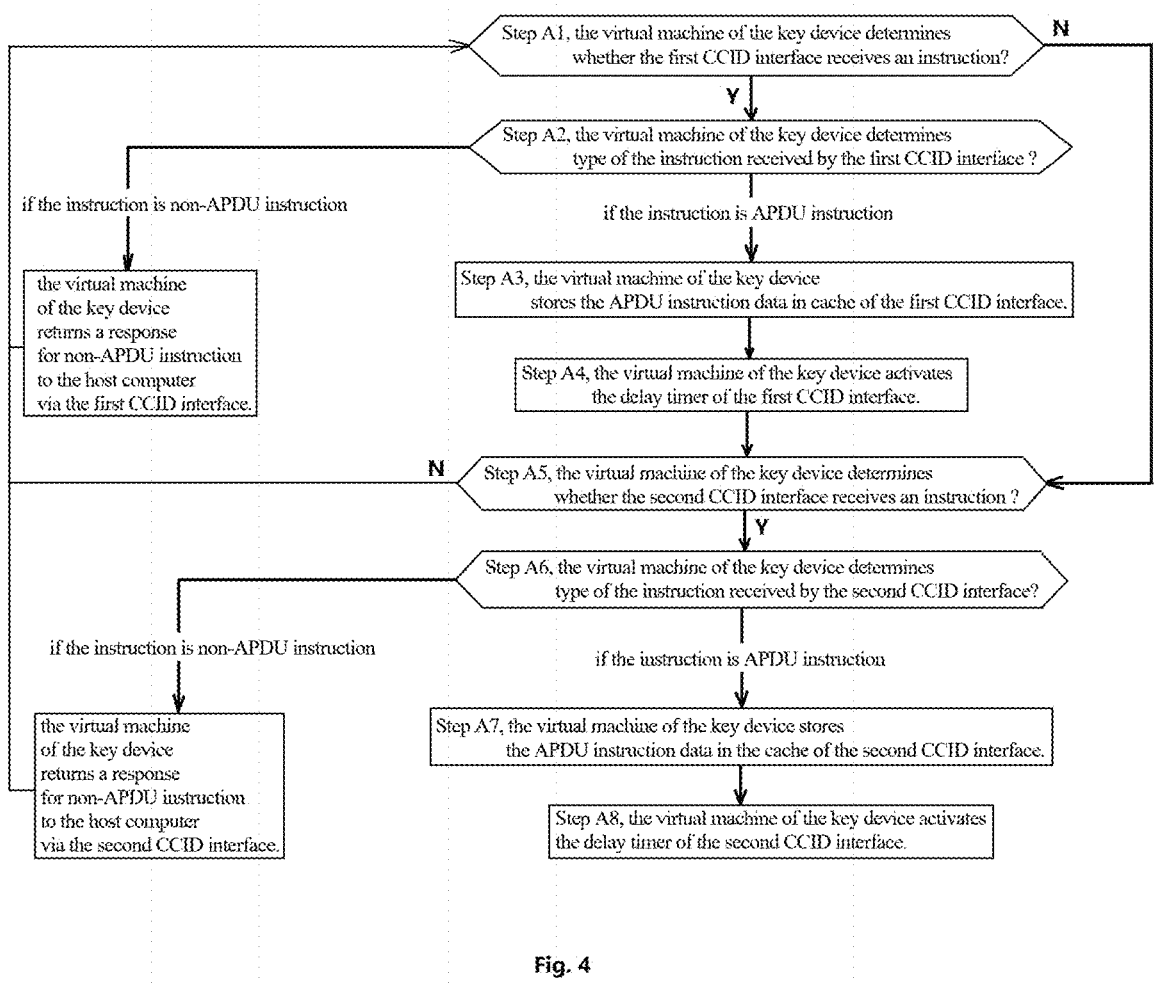
FIG. 4 is a flow chart of USB interruption process in the implementing method for increasing number of certificates supported by a PIV application provided in Embodiment 2 of the present invention.

In Embodiment 2, the method further includes: when a USB interruption is triggered, a USB interruption process is executed. As shown in FIG. 4, the USB interruption process includes the following the steps:

Step A1, the virtual machine of the key device determines whether the first CCID interface receives an instruction, if yes, executes Step A2, while if no, executes Step A5;

Step A2, the virtual machine of the key device determines type of the instruction received by the first CCID interface, if the instruction is non-APDU instruction, the virtual machine of the key device returns a response for non-APDU instruction to the host computer via the first CCID interface, if the instruction is APDU instruction, execute Step A3.

In Embodiment 2, the virtual machine of the key device determines type of the instruction received by the first CCID interface according to an instruction type identification; for example, the instruction sent from the host computer received by the first CCID interface of the virtual machine of the key device is: 6f 10 00 00 00 00 58 00 00 00 00 87 07 9a 0b 9b 1a 3e ea 16 af 0f a7 cf 9e 6c, the type of the instruction is determined to be APDU instruction according the instruction type identification 6f; and the APDU instruction is determined to be PIV application authentication instruction according to the twelfth byte 87.

Step A3, the virtual machine of the key device stores the APDU instruction data in cache of the first CCID interface.

In Step 213, for example, the virtual machine of the key device stores the instruction data of the PIV application authentication instruction in cache of the first CCID interface.

Step A4, the virtual machine of the key device activates the delay timer of the first CCID interface;

Step A5, the virtual machine of the key device determines whether the second CCID interface receives an instruction, if yes, execute Step A6, if no, go back to Step A1; and Step A6, the virtual machine of the key device determines type of the instruction received by the second CCID interface, if the instruction is non-APDU instruction, the virtual machine of the key device returns a response for non-APDU instruction to the host computer via the second CCID interface, goes back to Step A1, while if the instruction is APDU instruction, then executes Step A7.

In Embodiment 2, the virtual machine of the key device determines a type of the instruction received by the first CCID interface according to an instruction identification, for example, the virtual machine of the key device determines that the instruction sent from the host computer received by the second CCID interface is: 6f 10 00 00 00 00 58 00 00 00 00 87 07 9a 0b 9b 1a 3e ea 16 af 0f a7 cf 9e 6c, determines that the type of the instruction is APDU instruction according to the instruction type identification 6f; and the APDU instruction is determined to be PIV application authentication instruction according to the twelfth byte 87.

Step A7, the virtual machine of the key device stores the APDU instruction data in the cache of the second CCID interface.

Specifically, in Step A6, the virtual machine of the key device stores the instruction data of the PIV application authentication instruction in the second CCID interface cache.

Step A8, the virtual machine of the key device activates the delay timer of the second CCID interface.

In Embodiment 2, after the virtual machine of the key device activates the first CCID interface timer, the method further includes: the virtual machine of the key device sends a delay request to the host computer at a preset time interval regularly according to the timing of the delay timer of the first CCID interface;

after the virtual machine of the key device activates the first CCID interface timer, the method further includes: the virtual machine of the key device sends a delay request to the host computer at a preset time interval regularly according to the timing of the second CCID interface delay timer.

Embodiment 3

Figure 5:
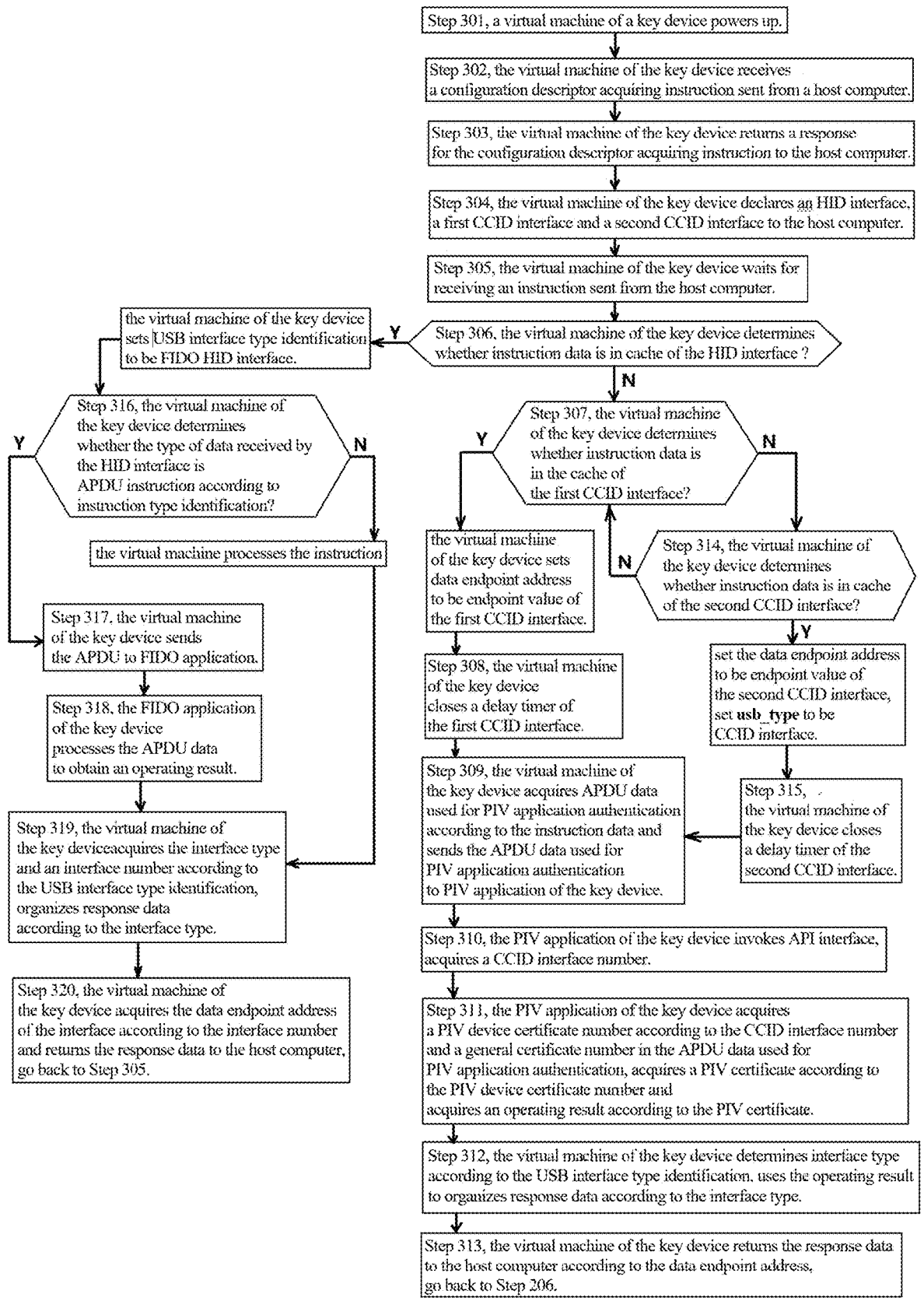
FIG. 5 is a flow chart of USB interruption process in the implementing method for increasing number of certificates supported by a PIV application provided in Embodiment 3 of the present invention.

Embodiment 3 provides a method for increasing a number of certificates supported by a PIV application. As Shown in FIG. 5, the method includes the following steps:

Step 301, a virtual machine of a key device powers up;

Step 302, the virtual machine of the key device receives a configuration descriptor acquiring instruction sent from a host computer;

Step 303, the virtual machine of the key device returns a response for the configuration descriptor acquiring instruction to the host computer;

Step 304, the virtual machine of the key device declares an HID interface, a first CCID interface and a second CCID interface to the host computer;

Step 305, the virtual machine of the key device waits for receiving an instruction sent from the host computer;

Step 306, the virtual machine of the key device determines whether instruction data is in a cache of the HID interface, if yes, the virtual machine of the key device sets USB interface type identification to be FIDO HID interface, executes Step 316, while if no, executes Step 307;

specifically, in Embodiment 3, the USB interface type identification is the usb_type;

Step 307, the virtual machine of the key device determines whether the instruction data is in the cache of the first CCID interface, if yes, the virtual machine of the key device sets the data endpoint address to be the endpoint value of the first CCID interface, sets the USB interface type identification to be CCID interface, then executes Step 308, while if no, executes Step 314;

Step 308, the virtual machine of the key device closes a delay timer of the first CCID interface;

Step 309, the virtual machine of the key device acquires APDU data used for aPIV application authentication according to the instruction data and sends the APDU data used for a PIV application authentication to the PIV application of the key device;

Step 310, the PIV application of the key device invokes an API interface, and acquires a CCID interface number;

Step 311, the PIV application of the key device acquires a PIV device certificate number according to the CCID interface number and a general certificate number in the APDU data used for PIV application authentication, acquires a PIV certificate according to the PIV device certificate number, and acquires an operating result according to the PIV certificate.

In the present embodiment 3, before executing Step 301, the method further includes a process for loading a certificate, and the process of loading certificate is the same as the process of loading certificate described in Embodiment 2; so, no more detail is given here.

In Embodiment 3, for example, the PIV application of the key device has loaded 6 certificate.

In Embodiment 3, the PIV application of the key device presets a corresponding relationship among the PIV device certification number and its corresponded CCID interface number and general certificate number;

a first PIV device certificate number corresponds to a first CCID interface number and a first general device certificate number;

a second PIV device certificate number corresponds to the first CCID interface number and a second general device certificate number;

a third PIV device certificate number corresponds to the first CCID interface number and a third general device certificate number;

a fourth PIV device certificate number corresponds to a second CCID interface number and the first general device certificate number;

a fifth PIV device certificate number corresponds to the second CCID interface number and the second general device certificate number; and a sixth PIV device certificate number corresponds to the second CCID interface number and the third general device certificate number.

Step 312, the virtual machine of the key device determines an interface type according to the USB interface type identification, and uses the operating result to organizes response data according to the interface type;

Step 313, the virtual machine of the key device returns the response data to the host computer according to the data endpoint address, then goes back to Step 206;

Step 314, the virtual machine of the key device determines whether instruction data is in the cache of the second CCID interface, if yes, sets the data endpoint address to be the endpoint value of the second CCID interface, sets the usb_type to be the CCID interface, and executes Step 315, while if no, goes back to Step 307;

Step 315, the virtual machine of the key device closes a delay timer of the second CCID interface;

Step 316, the virtual machine of the key device determines whether the type of data received by the HID interface is an APDU instruction according to instruction type identification, if yes, executes Step 317; while if no, executes Step 320 after the virtual machine processes the instruction;

Step 317, the virtual machine of the key device sends the APDU to an FIDO application;

Step 318, the FIDO application of the key device processes the APDU data to obtain an operating result;

Step 319, the virtual machine of the key device acquires the interface type and an interface number according to the USB interface type identification, organizes response data according to the interface type;

specifically, the USB interface type is the usb_type.

Figure 6:
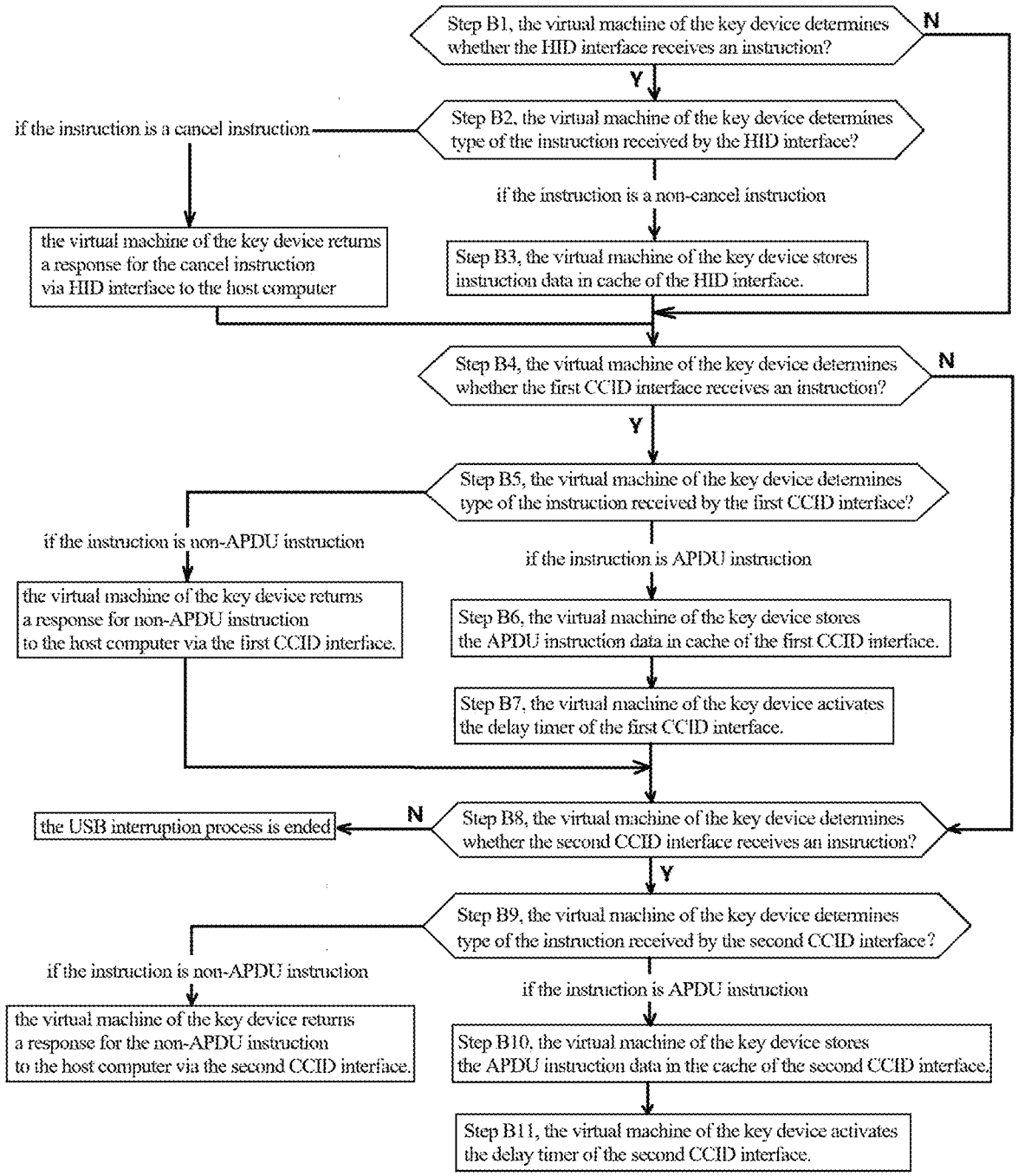
FIG. 6 is a flow chart of USB interruption process in the implementing method for increasing number of certificates supported by a PIV application provided in Embodiment 3 of the present invention.

Step 320, the virtual machine of the key device acquires the data endpoint address of the interface according to the interface number and returns the response data to the host computer, then goes back to Step 305. a In Embodiment 3, the method further includes: when a USB interruption is triggered, executing a USB interruption process. As shown in FIG. 6, the USB interruption process includes the following steps:

Step B1, the virtual machine of the key device determines whether the HID interface receives an instruction, if yes, executes Step B2, while if no, executes Step B4;

Step B2, the virtual machine of the key device determines type of the instruction received by the HID interface, if the instruction is a cancel instruction, the virtual machine of the key device returns a response for the cancel instruction via HID interface to the host computer, execute Step B4, if the instruction is a non-cancel instruction, executes Step B3;

Step B3, the virtual machine of the key device stores instruction data in the cache of the HID interface;

Step B4, the virtual machine of the key device determines whether the first CCID interface receives an instruction, if yes, executes Step B5, while if no, executes Step B8;

Step B5, the virtual machine of the key device determines a type of the instruction received by the first CCID interface, if the instruction is APDU instruction, executes Step B6, while if the instruction is non-APDU instruction, the virtual machine of the key device returns a response for non-APDU instruction to the host computer via the first CCID interface, then executes Step B8;

Step B6, the virtual machine of the key device stores the APDU instruction data in the cache of the first CCID interface;

Step B7, the virtual machine of the key device activates the delay timer of the first CCID interface;

Step B8, the virtual machine of the key device determines whether the second CCID interface receives an instruction, if yes, executes Step B9, while if no, the USB interruption process is ended;

Step B9, the virtual machine of the key device determines a type of the instruction received by the second CCID interface, if the instruction is non-APDU instruction, the virtual machine of the key device returns a response for the non-APDU instruction to the host computer via the second CCID interface, while if the instruction is APDU instruction, executes Step B10;

Step B10, the virtual machine of the key device stores the APDU instruction data in the cache of the second CCID interface; and Step B11, the virtual machine of the key device activates the delay timer of the second CCID interface.

Preferably, Embodiment 3 of the present disclosure further provides an apparatus of increasing a number of certificates supported by a PIV application. The apparatus includes at least one processor, a storage and at least one processor executable instruction stored in the storage, the at least one processor executes the computer executable instruction to implement the method of Embodiment 3. When the apparatus is a chip system, the apparatus may be constituted by a chip, or include a chip and other separated elements, which is not limited by Embodiment 3; and the chip is coupled to the storage and is configured to execute computer program stored in the storage to implement the method of managing mnemonic word disclosed in Embodiment 3.

The Embodiment 3 described above may be implemented by using a software, a hardware, a firmware, or any combination thereof. When a software program is used to implement the Embodiment 3, the Embodiment 3 may be implemented completely or partially in a form of a computer program product. The computer program product includes one or more computer program instructions. When the computer program instructions are loaded and executed on a computer, the procedures or functions according to the Embodiment 3 of this application are all or partially generated. The computer instructions may be stored in a computer-readable storage medium or may be transmitted from a computer-readable storage medium to another computer-readable storage medium. For example, the computer instructions may be transmitted from a base station, apparatus, server, or data center to another base station, apparatus, server, or data center in a wired (for example, a coaxial cable, an optical fiber, or DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although the application is described with reference to the embodiments, in a procedure of implementing the application that claims protection, those skilled in the art may understand and implement another variation of the disclosed embodiments by viewing the accompanying drawings, the disclosed content, and the appended claims. In the claims, "comprise" (comprising) does not exclude another component or another operation, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

It should be understood that various changes and modifications to the presently preferred embodiments disclosed herein will be apparent to those skilled in the art. Such changes and modifications can be made without departing from the spirit and scope of the inventive subject matter and without diminishing its intended advantages. It is therefore intended that such changes and modifications should be covered by the appended claims.

The invention claimed is:

1. A method for increasing a number of certificates supported by a Personal Identity Verification (PIV) application, comprising the following Steps:
    1) powering up, by a virtual machine of a key device, and declaring a first Chip/Smart Card Interface Devices (CCID) interface and a second CCID interface to a host computer;
    2) waiting for, by the virtual machine, an instruction sent from the host computer;
    3) determining, by the virtual machine, whether any instruction data is in a cache of the first CCID interface, if yes, setting a data endpoint address to be an endpoint address of the first CCID interface, then executing Step 4, if no, executing Step 8;
    4) acquiring, by the virtual machine, Application Protocol Data Unit (APDU) data used for PIV application authentication according to the instruction data, and sending the APDU data used for PIV application authentication to the PIV application of the key device;
    5) acquiring, by the PIV application of the key device, a CCID interface number by invoking an Application Programming Interface (API) interface;
    6) acquiring, by the PIV application of the key device, a PIV device certificate number according to a general device certificate number in the APDU data used for PIV application authentication and the CCID interface number, acquiring a PIV certificate according to the PIV device certificate number, and performing operation according to the PIV certificate to obtain an operating result;
    7) returning, by the virtual machine, the operating result to the host computer according to the data endpoint address, then going back to Step 3; and
    8) determining, by the virtual machine, whether any instruction data is in a cache of the second CCID interface, if yes, setting the data endpoint address to be an endpoint address of the second CCID interface, then executing Step 4, if no, going back to Step 3;
    in which the method further comprises: when a Universal Serial Bus (USB) interruption triggering happens, a USB interruption process is performed, and the USB interruption process includes the following steps:
    1A) determining, by the virtual machine of the key device, whether the first CCID interface receives an APDU instruction, if yes, storing, by the virtual machine, the instruction data of the APDU instruction in a cache of the first CCID interface, if no, executing Step 2A; and
    2A) determining, by the virtual machine, whether the second CCID interface receives an APDU instruction, if yes, storing, by the virtual machine, the instruction data of the APDU instruction in a cache of the second CCID interface, if no, going back to Step TA.

2. The method of claim 1, wherein
    in Step 3, after setting the data endpoint address to be the endpoint address of the first CCID interface, the method further comprises: closing a delay timer of the first CCID interface;
    in Step 8, after setting the data endpoint address to be the endpoint address of the second CCID interface, the method further includes: closing a delay timer of the second CCID interface;
    in Step 1A, after storing, by the virtual machine, the instruction data of the APDU instruction in the cache of the first CCID interface, the method further includes: activating the delay timer of the first CCID interface, sending a delay request to the host computer via the first CCID interface according to timing of the delay timer of the first CCID interface at a preset time interval; and in Step 2A, after storing, by the virtual machine, the instruction data of the APDU instruction in the cache of the second CCID interface, the method further includes: activating the delay timer of the second CCID interface, sending a delay request to the host computer via the second CCID interface according to timing of the delay timer of the second CCID interface at a preset time interval.

3. The method of claim 1, wherein

Step 1A specifically is: determining, by the virtual machine, whether the first CCID interface receives an APDU instruction used for PIV application authentication, if yes, the virtual machine stores instruction data of the APDU instruction used for PIV application authentication in the cache of the first CCID interface, if no, execute Step 2A; and/or Step 2A specifically is: determining, by the virtual machine, whether the second CCID interface receives an APDU instruction used for PIV application authentication, if yes, the virtual machine stores instruction data of the APDU instruction used for PIV application authentication in the cache of the second CCID interface, if no, going back to Step 1A.

4. The method of claim 1, wherein before Step 1, the method further comprises a process for loading a certificate, which includes the following steps:

01) receiving, by virtual machine of the key device, a certificate importing instruction sent from the host computer, and sending instruction data of the certificate importing instruction to the PIV application of the key device; and 02) setting, by the PIV application of the key device, a PIV certification number of an imported certificate according to a value of a preset byte in the instruction data of the certificate importing instruction.

5. The method of claim 1, wherein before Step 1, the method further includes a process for loading a certificate, which includes the following steps:

01') receiving, by the virtual machine of the key device, a certificate importing instruction sent from the host computer, and sending instruction data of the certificate importing instruction to the PIV application of the key device;

02') acquiring, by the PIV application of the key device, a CCID interface number of the certificate importing instruction, setting the PIV device certificate number of an imported certificate according to a value of a preset byte in the instruction data of the certificate importing instruction and the CCID interface number.

6. The method of claim 1, wherein

Step 1 further comprises: powering up, by the virtual machine of the key device, and declaring Human Interface Device (HID) interface, after Step 2, the method further comprises: determining, by the virtual machine, whether the HID interface has any instruction data, if yes, execute Step m1; if no, execute Step 3;

m1) setting, by the virtual machine, a USB interface type identification to be the HID interface, determining whether the instruction data is APDU data, if yes, execute Step m3, if no, executing Step m2;

m2) performing, by the virtual machine, operation on the instruction data, so as to obtain operating result, then executing Step m5;

m3) sending, by the virtual machine, the instruction data to a Fast Identity Online (FIDO) application of the key device;

m4) performing, by the FIDO application of the key device, operation on the instruction data so as to obtain an operating result;

m5) acquiring, by the virtual machine, a data endpoint address according to the USB interface type identification, returning the operating result to the host computer according to the data endpoint address, then executing Step 2;

in USB interruption process, before Step TA, the process further includes:

01A) determining, by the virtual machine of the key device, whether the HID interface receives an instruction, if yes, executing Step 02A, if no, executing Step 1A;

02A) determining, by the virtual machine, an instruction type of the instruction received by the HID interface, if the instruction is a cancel instruction, returning, by the virtual machine, a response of the cancel instruction via the HID interface to the host computer; if the instruction is a non-cancel instruction, storing, by the virtual machine, the instruction data of the non-cancel instruction in the cache of the HID interface, then executing Step 1A;

in Step 2A, if no, going back to Step TA specifically is: if no, ending the USB interruption process.

7. The method of claim 6, wherein Step m2 specifically is: determining, by the virtual machine, a type of the instruction data, when the instruction data are Message (MSG) data, executing Step m3; when the instruction data are Concise Binary Object Representation (CBOR) data, filling, by the virtual machine, CBOR data to obtain extension APDU data, sending the extension APDU data to the FIDO application; and when the instruction data are Initialization (INIT) data, performing, by the virtual machine, operation on the INIT data so as to obtain an operating result, then executing Step m5.

8. An apparatus for increasing number of certificates supported by a PIV application, wherein the apparatus comprises at least one processor, a storage and at least one processor executable instruction stored in the storage, the at least one processor executes a computer executable instruction to implement the method of claim 1.

* * * * *